United States Patent [19]

Richard et al.

[11] Patent Number: 5,162,381
[45] Date of Patent: Nov. 10, 1992

[54] PROCESS FOR PREPARING THERMALPLASTIC FOAM

[75] Inventors: Robert G. Richard, Cheektowaga; Ian R. Shankland, Williamsville, both of N.Y.

[73] Assignee: Allied-Signal Inc., Morris Township, Morris County, N.J.

[21] Appl. No.: 805,420

[22] Filed: Dec. 10, 1991

[51] Int. Cl.$^5$ .............................. C08J 9/08; C08J 9/14
[52] U.S. Cl. .......................... 521/89; 521/97; 521/98; 521/142; 521/143; 521/146; 521/910; 521/79; 521/81; 264/53; 264/DIG. 5; 264/51
[58] Field of Search ............ 521/79, 89, 81, 98, 521/97, 143, 146, 910; 264/51, 53, DIG. 5

[56] References Cited

U.S. PATENT DOCUMENTS

| | | | |
|---|---|---|---|
| 2,917,217 | 12/1959 | Sisson | 229/4.5 |
| 3,121,911 | 2/1964 | Lightner | 18/2 |
| 3,231,524 | 1/1966 | Simpson | 260/2.5 |
| 3,311,681 | 3/1967 | Cherney | 264/48 |
| 3,539,473 | 11/1970 | Simpson et al. | 260/2.5 |
| 3,641,760 | 2/1972 | Keuchel | 264/103 |
| 3,657,165 | 4/1972 | Kawai et al. | 260/2.5 E |
| 3,725,317 | 4/1973 | Roden et al. | 521/92 |
| 3,874,965 | 4/1975 | Greenwald et al. | 264/51 |
| 3,960,792 | 6/1976 | Nakamura | 521/79 |
| 4,085,073 | 4/1978 | Suh et al. | 260/2.5 E |
| 4,085,175 | 4/1978 | Keuchel | 264/51 |
| 4,228,246 | 10/1980 | Taub et al. | 521/98 |
| 4,927,863 | 5/1990 | Bartlett | 521/131 |

FOREIGN PATENT DOCUMENTS 225166  3/1990  Japan .
854586  11/1960  United Kingdom .

OTHER PUBLICATIONS

The Elements of Expansion of Thermoplastics, James G. Burt, Freon Prod. Laboratory E. I. du Pont de Nemours & Co. Wilmington, DE pp. 31-34.
Diffusion in a plane sheet, The Mathematics of Diffusion, second edition, pp. 49-51.

Primary Examiner—Morton Foelak
Attorney, Agent, or Firm—Karen A. Harding

[57] ABSTRACT

This invention relates to a novel, environmentally acceptable blowing agent and blowing agent blends and a process for producing thermalplastic, and particularly polyolefin foams using the environmentally acceptable blowing agent(s). The blowing agents of the present invention comprise difluoromethane and optionally a second blowing agent component which is nonflammable and possesses good blowing agent properties. Polyolefin foam is made by mixing a polyolefin resin and the blowing agent and introducing the resin/blowing agent mixture into a zone of lower pressure.

10 Claims, No Drawings

PROCESS FOR PREPARING THERMALPLASTIC FOAM

FIELD OF THE INVENTION

This invention relates to an improved process for making thermalplastic foam, and particularly polyolefin foam using difluoromethane, either alone or in a blend as the blowing agent. Difluoromethane is environmentally acceptable and when used in the process of the present invention produces polyolefin foams, and particularly polstyrene foam having good properties.

BACKGROUND OF THE INVENTION

The invention relates to the preparation of polyolefin foams, particularly polystyrene foams, by extrusion of a heat plasticized polyolefin resin in the presence of an environmentally acceptable blowing agent or blowing agent blend.

It is well known in the art to prepare a variety of polyolefin foams by blending molten or heat plasticized polyolefin resin with a volatile foaming agent or blowing agent, and extruding the resin/foaming agent mixture from a pressurized chamber through an orifice into a zone of lower pressure. Upon release of the pressure the normally gaseous volatile foaming agent vaporizes and expands the polyolefin to form a stable cellular body.

A variety of volatile blowing agents have been employed in preparation of such foams. Pentane has been proven useful particularly in connection with the blowing of polystyrene foams. However, n-pentane is highly flammable and for this reason elaborate and expensive precautions must be taken when it is used.

Various volatile halogenated hydrocarbons that are non-flammable or barely flammable have been tried as blowing agents for polyolefin foams. However, most of the halogenated hydrocarbons tested failed to produce foam with good properties. Methylene chloride, trichlorofluoromethane and chlorodifluoromethane are examples. Methylene chloride and trifluoromethane are too soluble in the polystyrene and result in foam which has a non-uniform and excessively large cell size. While chlorodifluoromethane produces a foam with acceptable structural properties, the residual chlorodifluoromethane contained in the product restricts its handling in certain applications, especially as food containers. FDA has specified that chlorodifluoromethane levels must be below certain values before direct food contact (see Food Drug and Cosmetic Act section 409(b)(5)(21 U.S.C. 348(b)(5)).

U.S. Pat. No. 4,228,246 discloses the use of dichlorodifluoromethane as a blowing agent for the preparation of a variety of polyolefin foams, including polyethylene and polystyrene. However, particularly in the case of polystyrene, dichlorodifluoromethane has proven to be unduly insoluble, resulting in premature foaming which yields foam with excessively small cell size. Furthermore, the rapid foaming and the poor solubility characteristics of dichlorodifluoromethane cools the product too soon after the extrusion which then requires excessive "cold working" i.e. shaping the resulting foam after extrusion at temperatures near or below its solidification temperature. Further, large amounts of energy must be used to process polystyrene foam containing dichlorodifluoromethane as the blowing agent because extrusion processability is poor. The blowing agent solubility requirements for producing foams with good properties are reviewed by J.G. Burt, *Proc. of Soc. of Plastics Engineers*, p. 31–34, Quebec (Apr. 1977).

U.S. Pat. No. 3,539,473 discloses the use of certain blends of iso- or n-pentane and dichlorodifluoromethane as blowing agents for certain polyolefin foams.

A disadvantage of continuing to use dichlorodifluoromethane is that fully and even partially halogenated chlorinated hydrocarbons have been implicated in causing environmental problems. Specifically, CFC-12 (dichlorodifluoromethane) has substantial potential for stratospheric ozone depletion and global warming. Chlorodifluoromethane has become widely used because of its lower ozone depletion than dichlorodifluoromethane but it does have disadvantages. It has an ozone depletion potential and the need for low residuals requires slowed processing or warehousing. Further hydrocarbons like pentane are volatile organic compounds (VOC) that can cause smog. VOC emissions and the use of CFCs are being regulated.

It is apparent that there is a need in this art for novel volatile blowing agents or blowing agent blends which are capable of efficiently producing polyolefin foams having good properties, good extrusion processability and no or minimal negative environmental impact.

Further, because foam containers made from blowing agents which have not been approved for food contact and which have low permeabilities are required to stand before receiving food, blowing agents which have higher permeabilities, which would decrease the required standing time of the foam containers are desirable.

BRIEF DESCRIPTION OF THE INVENTION

The present invention provides a process for making thermal plastic foam using a novel blowing agent or blowing agent blends. The blowing agent comprises difluoromethane used alone or with another blowing agent component chosen from a critically defined group. The improved process uses the above agent or blend to form a foam which has good properties and is environmentally safe.

DETAILED DESCRIPTION OF THE INVENTION

The polyolefin resin suitable for use in the process of the present invention may be any of the well known resins of the type which are known to be extrudable by the technique described above. These are numerous and well known to those in the art. An exemplary class of a suitable polyolefin resins in accordance with the invention are polymers of monovinyl aromatic compounds of the formula Ar—CH=CH$_2$ wherein Ar is an aromatic hydrocarbon radical of the benzene series with up to about 10 weight percent of another readily copolymerizable olefin compound. This class of resins is described in more detail in U.S. Pat. No. 3,539,473 and as therein noted, includes such alkenyl aromatic resins such as the solid homopolymers of styrene, vinyltoluene, isopropylstyrene, Ar-fluorostyrene, solid copolymers of two or more of such monovinyl aromatic compounds and said copolymers of one or more of each monovinyl aromatic compounds and from about 1 to 10% by weight of other readily copolymerizable olefinic compounds such as acrylonitrile and methyl methacrylate or ethyl acrylate.

Other examples of suitable polyolefin resins in accordance with the invention include the various ethylene resins including the ethylene homopolymers such as low density polyethylene and high density polyethylene and ethylene copolymers such as ethylene-vinyl acetate copolymer, ethylene-propylene copolymer, ethylene-vinyl chloride copolymer and ethylene-acrylonitrile copolymer. Generally the ethylene content of such homopolymers or copolymers should be above about 50% by weight. The class of polyolefin resin is described in more detail in U.S. Pat. No. 3,657,165.

The preferred class of polyolefin resin is the monovinyl aromatic compound class described above of which the preferred species is polystyrene. Further description herein will be made with particular reference to the preferred polystyrene species, with the understanding that such description is applicable to the generic class of polyolefin compositions described herein.

The volatile blowing agent to be used in accordance with this invention is a mixture of from 100 to about 1 mole percent difluoromethane and from 0 to about 99 mole percent of a second blowing agent or blend of blowing agents Preferably, this second blowing agent is any hydrofluorocarbon or fluorocarbon that is environmentally acceptable and still makes good foam with difluoromethane. "Good foam" has properties such as uniform cell size, good extruder processability, good permeability, etc. The use of non-flammable second blowing agents reduces the flammability of difluoromethane. When enough non-flammable blowing agent is used the mixture becomes nonflammable, a further advantage. Examples of such blowing agents are given in Table I. The Mol% is the minimum amount of the second blowing agent necessary to make the blowing agent blend non-flammable.

TABLE I

| COMPOUND | REFRIGERANT | MOL % CMPD |
|---|---|---|
| 1-chloro-1,2,2,2-tetrafluoroethane | 124 | 28.1 |
| pentafluoroethane | 125 | 20.9 |
| chlorodifluoroethane | 22 | 51.7 |
| 1,1,1,2-tetrafluoroethane | 134a | 27.1 |
| sulfur hexafluoride | $SF_6$ | 12.1 |
| trifluoromethane | 23 | 24.7 |
| hexafluoroethane | 116 | 11.9 |
| carbon dioxide | $CO_2$ | 44.8 |
| octafluoropropane | 218 | 6.1 |

Preferably the blowing agent blend comprises sufficient amounts of the non-flammable blowing agent to render the mixture nonflammable.

Difluoromethane is environmentally acceptable. Only forty three percent (43%) by weight. A blowing agent is required if difluoromethane is used as the blowing agent instead of dichlorodifluoromethane. The amount of a particular blend required depends upon the molecular weight of that blend in comparison to dichlorodifluoromethane. The ozone depletion potential for difluoromethane is zero, due to the lack of chlorine while the ozone depletion potential of dichlorodifluoromethane is 1.0. Other good blowing agents that are nonflammable can be combined to give a good foam that uses environmentally acceptable blowing agents and is nonflammable. An example is 1-chloro-1,2,2,2-tetrafluoroethane which is a good blowing agent and has a low ozone depletion potential. Since 1-chloro-1,2,2,2-tetrafluoroethane is nonflammable it can be used to suppress the flammability of difluoromethane: as little as 28.1 mol % 1-chloro-1,2,2,2,-tetrafluoroethane will suppress the flammability of difluoromethane. Other blowing agents which can be used to suppress the flammability of difluoromethane include pentafluoroethane (20.9 mol %) or chlorodifluoromethane (51.7 mol %). The amount (in mol. %) of other blowing agents required to suppress the flammability of difluoromethane is listed in Table I, above.

Difluoromethane and difluoromethane blends are useful for food packaging and polyethylene foams. Difluoromethane blends make good insulating boardstock foams. The second component here would have a low permeability and would improve the insulting ability of the foam.

Still others will be obvious to those skilled in the arts of flame suppression and polyolefin foam production.

A variety of nucleating agents may be employed as is well known to persons skilled in the art, such as are set forth in British Pat. No. 854,586 and U.S. Pat. No. 3,231,524. Such materials include, for example, inorganic substances such as talc, clay, silica, titanium oxide and zinc oxide, and organic substances such as metallic salts of fatty acids, such as barium stearate or aluminum stearate, or a combination of an organic acid such as tartaric acid, citric acid or oleic acid and sodium carbonate or sodium bicarbonate. Such materials are required to control the cell size in the foam.

Extrusion techniques and procedures as well as conditions therefore, are well known in the art and need not be discussed in detail herein. Generally the extrudable composition is prepared by mixing the selected resin with a nucleating agent, heat plastifying the resin within an extruder, adding the blowing agent to the heat plastified material in the extruder and employing the extruder to admix the blowing agent with heat plastified material. Alternatively the blowing agent may be incorporated within the polyolefin resin particles either during polymerization or by the steeping-in process as known in the art and subsequently passing the mixture to an extruder.

Generally the temperature of the heating zone of the extruder is maintained from 250° F. to 500° F., preferably from about 300 F to about 450.F. Foaming will not occur when no heat plasticizing (melting) of the polymer takes place. On the other hand when the temperature is too high the foam will start to collapse through cell wall drainage caused by low viscosity.

The pressure at which the blowing agent is blended into the resin should be from about 1000–3000 p.s.i. These ranges are not critical. They may be adjusted as required by those skilled in the art depending on choice of materials, properties desired and other factors. The various techniques for carrying out the extrusion of the foams are well known in the art and are illustrated, for example, in U.S. Pat. Nos. 2,917,217, 3,121,911 and 3,311,681.

The polyolefin foams may be extruded in any suitable shape such as sheets, board stock and rods.

The following examples illustrate that foam can be produced using difluoromethane using a pressurized vessel for mixing the resin and blowing agent, which is rapidly depressurized to create foam. Foams produced by this technique have relatively poor properties (especially cell size) as compared to extruded foams. However, the production of a foam by the above method is a good indication that acceptable foams may be produced via commercial extrusion techniques.

EXAMPLE 1

A small 304 grade stainless steel pressure vessel was constructed using schedule 40 pipe which was 4 inches in length and 2 inches in diameter. The vessel had top and bottom flanges which were used to close the ends of the cell. A pressure tight seal was maintained between the ends of the pipe and the flanges using Teflon o-rings. The vessel was closed by tightening 4 bolts which run the length of the cell through the top and bottom flanges. The design pressure limit for the apparatus was 1700 psi at 200° C.; the operational limit was set at 1000 psi.

Three grams of very finely ground Dow styrene 685D was placed into a 3 inch × 1.5 inch open glass jar. The glass jar was then placed in the pressure vessel which was closed and evacuated.

Twenty two and one half gram of difluoromethane was charged into the sealed vessel. The vessel was placed in a 250° F. oven overnight. The vessel was removed from the oven, rapidly depressurized and then immersed in water. The glass jar was removed from the vessel. The resulting foam was weighed and the volume was measured via water displacement. A 2.9 lb./cu.ft. density foam was obtained.

EXAMPLE 2

Three grams of very finely ground Dow Styrene 685D was placed in a 3 × 1.5 inch glass jar. The glass jar was then placed in the pressure vessel which was closed and evacuated. 36.47 grams of a 50/50 mol % mixture of difluoromethane and 1-chloro-1,2,2,2-tetrafluoroethane were charged into the sealed vessel. The vessel was placed in a 250° F. oven for five hours. The vessel was removed from the oven, rapidly depressurized and then immersed in water. The glass jar was removed from the vessel. The resulting foam was weighed, and the volume was measured via water displacement. A 2.75 lb/cu.ft. density foam was made.

EXAMPLE 3

The permeability of several blowing agents was measured. A sheet of polystyrene film was placed on a microblanace in an atmosphere of 100 mol % of the blowing agent to be measured. The weight of the polymer as a function of time was measured. As the blowing agent permeates into the polymer sheet the weight recorded increased. The rate of increase was determined by permeability as described by J. Crank, *The Mathematics of Diffusion*, pg. 50, 2d Ed., Claredon Press-Oxford (1975). The results are recorded in Table 2, below.

TABLE 2

| Blowing Agent | Permeability $\frac{10^{10} cm^3 (STP)cm.}{cm^2\ s\ cmHg}$ | Relative Permeability |
|---|---|---|
| CFC-12 | 0.00884 | 1.00 |
| HCFC-22 | 0.172 | 19.5 |
| HCF-32 | 2.048 | 232 |

Present EPA standards require that a foam food container have no more than 5 ppm chlorodifluoromethane. For the purposes of this Example, it was assumed that chlorodifluoromethane and difluoromethane would have to meet similar criteria. Comparing the relative permeabilities, chlorodifluoromethane (HCFC-22) had relative permeability of 19.5 as compared to dichlorodifluoromethane (CFC-12) which displayed a relative permeability of 1. Thus, it took chlorodifluoromethane 1/19.5 as long to reach a 3 ppm concentration in the polystyrene than it took dichlorodifluoromethane (CFC-12) to reach a 5 ppm concentration. Comparing the relative permeabilities of difluoromethane (232) and chlorodifluoromethane (19.5), it took difluoromethane 19.5/232 or about 1/12 as long to reach a 2 ppm concentration in polystyrene, than it took for the chlorodifluoromethane to reach a 3 ppm concentration in the polystyrene. The relative rate of permeability into the film and diffusion out of the foam are roughly equivalent. It is clear that foam containers made with difluoromethane would have to "stand" prior to use as a food container for only a fraction of the time that a foam container made from chlorodifluoromethane would have to stand.

What is claimed is:

1. In the process for making polyolefin foam comprising blending heat plasticized polyolefin resin with a volatile blowing agent and introducing the resin/volatile blowing agent blend into a zone of lower pressure to cause foaming;

the improvement which comprises using difluoromethane and at least one second blowing agent component which is non-flammable and possesses foam enhancing qualities as said volatile blowing agent selected from the group consisting of a hydrofluorocarbon, a fluorocarbon, sulfur hexafluoride or carbon dioxide.

2. The process of claim 1 wherein said polyolefin foam is polystyrene.

3. The process of claim 1 wherein said at least one second blowing agent component is chosen from the group consisting of 1-chloro-1,2,2,2-tetrafluoroethane, pentafluoroethane, chlorodifluoromethane, 1,1,1,2-tetrafluoroethane, sulfur hexafluoride, trifluoromethane, hexafluoroethane, carbon dioxide and octafluoropropane.

4. The process of claim 1 wherein said at least one second blowing agent is present in an amount between about 6 mol% and about 99 mol%, such that said blowing agent is non-flammable.

5. The process of claim 3 wherein said second blowing agent component is 1-chloro-1,2,2,2-tetrafluoroethane.

6. The process of claim 5 wherein said 1-chloro-1,2,2,2-tetrafluoroethane is present in an amount between about 28 mol % to about 99 mol%, such that said blowing agent is non-flammable.

7. The process of claim 2 wherein said at least one second blowing agent component is chosen from the group consisting of 1-chloro-1,2,2,2-tetrafluoroethane, pentafluoroethane, chlorodifluoromethane, 1,1,1,2-tetrafluoroethane, sulfur hexafluoride, trifluoromethane, hexafluoroethane, carbon dioxide and octafluoropropane.

8. The process of claim 7 wherein said at least one second blowing agent is present in an amount between about 6 mol% and about 99 mol%, such that said blowing agent is non-flammable.

9. The process of claim 2 wherein said second blowing agent component is 1-chloro-1,2,2,2-tetrafluoroethane.

10. The process of claim 9 wherein said 1-chloro-1,2,2,2-tetrafluoroethane is present in an amount between about 28 mol % to about 99 mol %, such that said blowing agent is non-flammable.

* * * * *